United States Patent
Fuerst et al.

(10) Patent No.: US 6,942,390 B2
(45) Date of Patent: Sep. 13, 2005

(54) BEARING DEVICE FOR THE ROTOR OF A ROTATING MACHINE

(75) Inventors: Axel Guenter Albert Fuerst, Gebenstorf (CH); Kamil Matyscak, Brenden (DE)

(73) Assignee: ALSTOM Technology Ltd., Baden (CH)

( * ) Notice: Subject to any disclaimer, the term of this patent is extended or adjusted under 35 U.S.C. 154(b) by 143 days.

(21) Appl. No.: 10/470,558

(22) PCT Filed: Feb. 1, 2002

(86) PCT No.: PCT/IB02/00358
§ 371 (c)(1),
(2), (4) Date: Oct. 14, 2003

(87) PCT Pub. No.: WO02/061923
PCT Pub. Date: Aug. 8, 2002

(65) Prior Publication Data
US 2004/0101221 A1 May 27, 2004

(30) Foreign Application Priority Data
Feb. 2, 2001 (DE) ........................ 101 04 696
Mar. 19, 2001 (CH) ........................ 0500/01

(51) Int. Cl.$^7$ ........................ F16C 27/00; H02K 5/00
(52) U.S. Cl. ........................ 384/428; 384/535; 310/157
(58) Field of Search ........................ 384/428, 438, 384/441, 535, 581; 310/157

(56) References Cited

U.S. PATENT DOCUMENTS

| | | | | |
|---|---|---|---|---|
| 2,149,728 A | * | 3/1939 | Cronan | ........................ 384/535 |
| 2,936,999 A | * | 5/1960 | Jacobus et al. | ........................ 384/441 |
| 4,060,744 A | | 11/1977 | Starčević | |
| 4,258,280 A | | 3/1981 | Starčević | |
| 4,293,786 A | | 10/1981 | Starčević | |
| 6,386,753 B1 | * | 5/2002 | Blakley | ........................ 384/441 |

FOREIGN PATENT DOCUMENTS

| | | |
|---|---|---|
| CH | 578708 | 8/1976 |
| CH | 583469 | 12/1976 |
| DE | 1217490 | 5/1966 |
| DE | 24 59 237 | 5/1976 |
| EP | 0 586 861 A1 | 3/1994 |
| FR | 2282543 | 3/1976 |
| GB | 1484983 | 9/1977 |

OTHER PUBLICATIONS

Kellenberger, Dr. Walter, "Der optimale Winkel für die Abstützung von vertikalen Wasserdraftgeneratoren mit schrägen Armen oder Blattfedern", Brown Boveri Mitt. 2, vol. 67, pp. 108–116 (Feb. 1980, Brown Boveri Ltd.).

"Hydrogenerators with oblique elements. Top technology from ALSTOM power" (Sep., 2000, ALSTOM).

"Hydrogenerators with oblique elements. Top technology from ALSTOM power" (Sep., 2000, ALSTOM Power Hydro Generator Technology Center HGT, Birr, Switzerland).

* cited by examiner

Primary Examiner—Thomas R. Hannon
(74) Attorney, Agent, or Firm—Cermak & Kenealy, LLP; Adam J. Cermak

(57) ABSTRACT

A bearing arrangement for the rotor (11) of a rotating machine, in particular of a hydrogenerator (20) rotating about a vertical axis (19), comprises a combined axial and radial bearing (23) which is accommodated in a bearing body (24), on which supporting arms (27) are arranged for absorbing axial forces. The supporting arms (27) are supported with the free ends on a load-bearing base. Tangentially oriented connecting elements (29) are additionally provided between the bearing body (24) and a foundation (21), enclosing the rotor, for absorbing radial forces and for centering the bearing, which connecting elements (29) are fastened at a first end to the foundation (21) and are fastened at a second end to articulation points (31) arranged directly on the bearing body (24). This results in a material-saving construction, optimization of the individual bearing functions, and improved adjustability.

9 Claims, 3 Drawing Sheets

BEARING DEVICE FOR THE ROTOR OF A ROTATING MACHINE

FIELD OF THE INVENTION

The present invention relates to the field of rotating machines. It relates to a bearing arrangement for the rotor of a rotating machine according to the preamble of claim 1.

Such a bearing arrangement has been disclosed, for example, by the publication CH-A5-578 708.

DISCUSSION OF BACKGROUND

In rotating machines of large dimensions, such as vertically arranged hydrogenerators for example, special problems occur when mounting the rotors in bearings, these problems being caused in particular by the extreme ratio between the external dimensions, which usually amount to several meters, and the bearing play, which is within the range of tenths of a mm. The rotors of such hydrogenerators are normally fixed with regard to an axis of rotation by means of two radial or guide bearings at a distance from one another. The weight and other axial forces, originating in particular from the water turbine, are absorbed by at least one axial or supporting bearing, which is usually combined with one of the radial bearings to form a combined axial and radial bearing and is accommodated in a common bearing body. The bearing bodies are the central bodies of a star-shaped bearing bracket or star-shaped supporting bracket or star-shaped guide bracket which is formed by supporting arms starting from the bearing body in the radial direction. The supporting arms, for absorbing axial forces, are supported with their free outer ends in the axial direction either on the foundation, which is normally made of concrete and concentrically surrounds the generator, or on the stator of the generator. Examples of such star-shaped supporting brackets or star-shaped guide brackets are described in CH-A5-578 708 mentioned at the beginning or in U.S. Pat. No. 4,258,280 corresponding thereto or in CH-A5-583 469. An example of a combined axial and radial bearing or supporting and guide bearing is found in FIG. 1 of EP-A1-0 586 861.

In order to also be able to absorb radial forces which are caused, for example, by unbalance in the rotor or by interactions between rotor and stator, the supporting arms in the prior art have been extended in the radial direction up to the surrounding concrete wall and firmly screwed to metal elements embedded there. As a result, high rigidity of the star-shaped supporting bracket was achieved, this rigidity having been determined essentially by the rigidity of the arms stressed in compression in the longitudinal direction. A disadvantage with this arrangement, however, is that very high compressive forces acting in the radial direction are produced during a thermal expansion of the arms of the star-shaped supporting bracket, and these compressive forces, especially in the case of star-shaped supporting brackets arranged above the machine, cannot be readily absorbed by the concrete wall, which is rather thin there. In addition, such a rigid construction introduces large radial forces into the bearing housing. Said radial forces may affect the bearing play due to resulting eccentricity or deformation of the bearing housing and thus put the operability of the bearing at risk in the extreme case. It has therefore been proposed in CH-A5-583 469 already mentioned to mutually stiffen the arms of a star-shaped supporting bracket and to secure their free ends in the tangential direction in the concrete wall by prestressed rolling bodies, while they are mounted such as to be displaceable in the radial direction.

On the other hand, CH-A5-578 708 mentioned at the beginning has adopted another method of solving the problem associated with the thermal expansion in the case of star-shaped supporting brackets or star-shaped guide brackets: used here for absorbing radial forces are connecting elements which are arranged tangentially to an imaginary cylinder coaxial to the axis of rotation and—in a pure radial or guide bearing—form the arms of the star-shaped bearing bracket (see FIG. 2 of CH-A5-578 708) or—in a combined axial and radial bearing—run between the ends of the (radial) supporting arms and the concrete wall (shown in FIG. 6 of CH-A5-578 708). In more recent hydrogenerators (as are used, for example, in the Bieudron hydroelectric plant, Switzerland; in this respect also see the applicant's brochure "Hydro-generators with oblique elements. Top technology from ALSTOM power", September 2000), the supporting arms of the combined supporting and guide bearings including the connecting elements have a tangential orientation relative to the concrete wall in a continuous robust welded construction.

The tangentially oriented arrangement of the connecting elements or supporting arms achieves the effect that thermal expansions are converted into uncritical rotations of the bearing body about the machine axis. The mode of operation of the tangentially oriented connecting elements or oblique spokes is described in detail in the publication Brown Boveri Mitteilungen 2, volume 67, pages 108–116, February 1980.

However, a disadvantage with the conventional star-shaped supporting brackets having tangentially oriented connecting elements is the direct linkage between the actual supporting arms, which absorb the axial forces and pass them into the foundation, and the tangential connecting elements, which convert the radial forces into a rotation and are responsible for the centering of the bearing body. This direct linkage leads on the one hand to heavy constructions of the star-shaped bearing bracket, which require a lot of material, and prevents on the other hand separate optimization of the construction elements responsible for the axial and radial forces. In addition, asymmetrical deformations, as may occur due to changes in the foundation or due to powerful electromagnetic fields, cannot be readily compensated for.

SUMMARY OF THE INVENTION

The object of the invention is therefore to provide a bearing arrangement for the rotor of a rotating machine, in particular of a hydrogenerator rotating about a vertical axis, which bearing arrangement avoids the disadvantages of known bearing arrangements and is distinguished in particular by a material-saving construction, optimization of the individual bearing functions and improved adjustability.

The object is achieved by all the features of claim 1 in their entirety. The essence of the invention, in the combined axial and radial bearing, consists in completely separating the absorption of the axial forces, such as forces due to weight and thrust forces, from the absorption of radial forces and from the centering and radial guidance task by tangentially oriented connecting elements being provided for the absorption of radial forces and for the centering, which connecting elements are linked with one end to the foundation and with the other end directly to the bearing body. The expression "tangential orientation" within the scope of the present invention refers to the fact that the connecting elements are arranged such as to be inclined by an angle at their articulation point in the circumferential direction relative to the radius. This angle of inclination is at all events greater than 0°, preferably greater than 30°, and reaches 90° in the case of a fully tangential orientation. This configuration can be regarded in a simplified manner as a combination of two star-shaped bearing brackets which are independent of one another. As a result, it is possible, in particular, to dispense with complicated transverse struts between the supporting arms of the star-shaped bearing bracket. In addition, the supporting construction can be simplified and material and weight can thus be saved by the arrangement according to the invention.

It is advantageous in this construction if the elements which bear the axial load are designed to be flexible in the circumferential direction and if the tangentially oriented elements have as low a rigidity as possible in the axial direction.

The tangentially oriented connecting elements are preferably designed such as to be adjustable in their length, the connecting elements being designed, in particular, such as to be infinitely adjustable in length like a turnbuckle by a combination of a left-hand and a right-hand thread. As a result, it is possible in a simple manner and at any time to carry out centering or correct the centering and also advantageously influence the operating behavior of the rotor and of the entire machine by producing certain, even nonuniformly distributed, prestresses.

The separation of the axially and radially acting star-shaped bearing brackets and the flexible adaptation of the bearing arrangement are further improved if the connecting elements are also designed, as articulated struts which are pivotably linked by means of bearing blocks to the bearing body and to the foundation, respectively. Such articulated struts and the associated bearing blocks are obtainable as prefabricated parts in different dimensions and thus reduce the costs of the construction.

It is especially advantageous for the separation of the axial and radial bearing functions if, within the combined axial and radial bearing, the radial bearing and the axial bearing are arranged offset from one another in the axial direction, and the connecting elements are linked to the bearing body in the region of the radial bearing and the supporting arms are linked to the bearing body in the region of the axial bearing.

Further embodiments follow from the dependent claims.

BRIEF EXPLANATION OF THE FIGURES

The invention is to be explained in more detail below with reference to exemplary embodiments in connection with the drawing, in which.

WAYS OF IMPLEMENTING THE INVENTION

Figure 1:
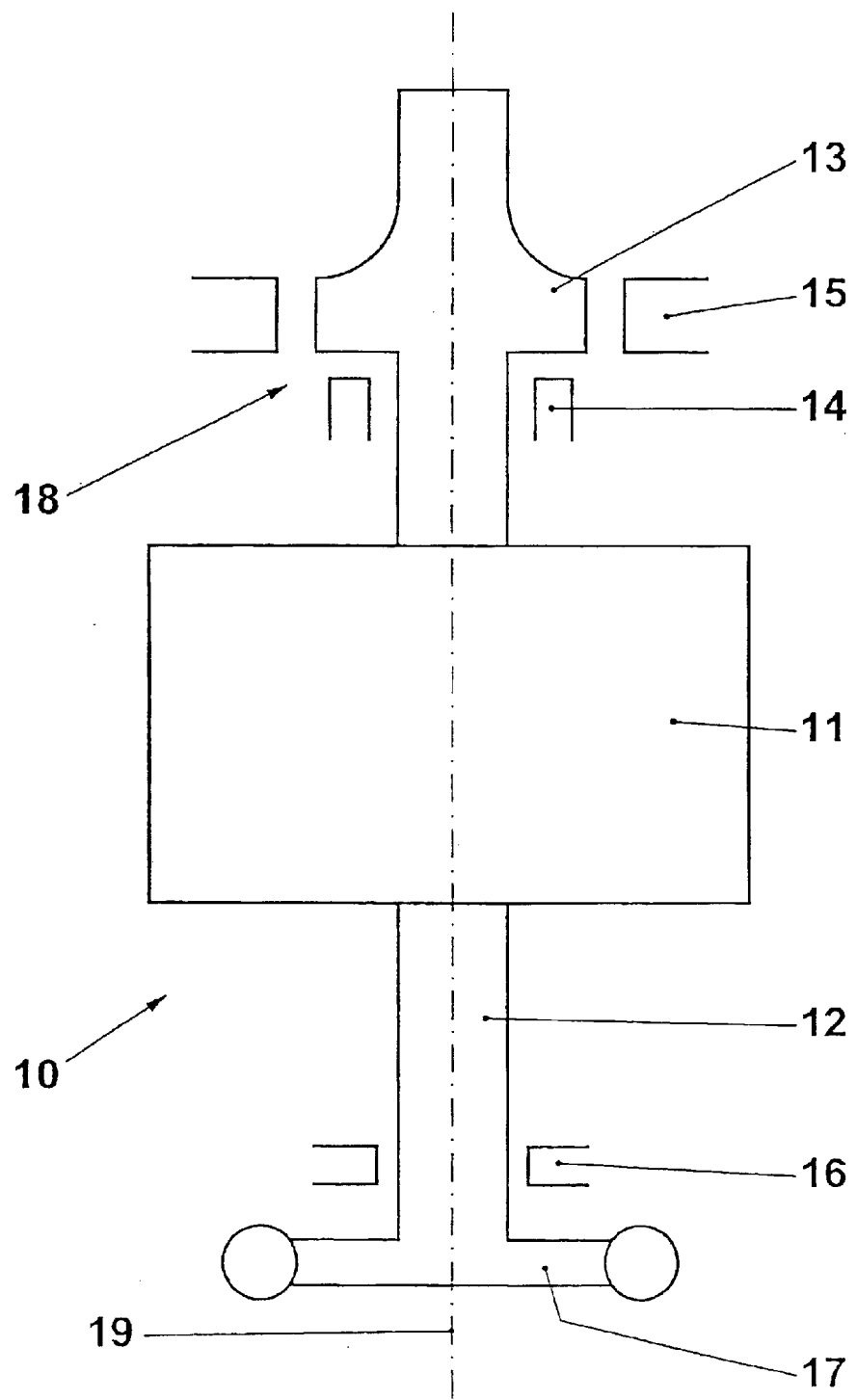
FIG. 1 shows a schematic longitudinal section of the rotor of a vertical hydrogenerator, this rotor being mounted by means of a radial bearing and a combined axial and radial bearing, as is especially suitable for the application of the invention.

A schematic longitudinal section of the rotor 11 of a hydrogenerator 10 is shown in FIG. 1, in which rotor 11 the invention can be used in an especially advantageous manner. The invention shown may of course also be advantageously used for other machines, such as, for example, when mounting the propulsion line of large ships in bearings. The rotor 11 rotates about a vertical axis 19. It has a shaft 12 which is rotatably mounted by means of a (bottom) radial bearing 16 and a (top) combined axial and radial bearing 18. The combined axial and radial bearing 18 comprises a second radial bearing 15 and an axial bearing 14 arranged one above the other, the shaft 12 resting on the axial bearing 14 by means of a supporting ring 13. The radial bearings 15, 16 are provided for guiding and centering the rotor 11 with regard to the axis 19 of rotation. In addition, they absorb radial forces, which may be produced, for example, by unbalance of the rotor. The axial bearing 14 absorbs the axial forces, which in particular result from the dead weight of the rotor 11, from the electromagnetic interaction between the rotor 11 and the stator (not shown in FIG. 1) concentrically surrounding it, and from the thrust which is produced by the effect of the water on the turbine 17 attached to the bottom end of the rotor 11. However, the combined axial and radial bearing 18 may also change position with the radial bearing 16 and may accordingly be arranged at the bottom.

The present invention, then, relates to the way in which the axial and radial forces acting on the combined axial and radial bearing 18 are passed directly or via the stator into the foundation, normally made of concrete, of the machine. To this end, a preferred exemplary embodiment for a bearing arrangement according to the invention is reproduced in FIG. 2 in a perspective view obliquely from above. Shown in the figure is the (top) combined axial and radial bearing 23 of a hydrogenerator 20, which is surrounded by a hollow-cylindrical, annular foundation 21 made of concrete. Part of the shaft 22 of the rotor extends through the combined axial and radial bearing 23, which is open at the top. The active rotor part is flange-mounted on this part of the shaft 22 by means of a flange 32 (FIG. 3), which is arranged below the bearing 23. The combined axial and radial bearing 23 comprises a radial bearing 25 and an axial bearing (which cannot be seen in FIGS. 2 and 3) arranged underneath. Both bearings are arranged in a bearing body 24, which is defined on the outside by an annular outer shell.

Six supporting arms 27 are attached to the bearing body 24 in the bottom region of the axial bearing in a star-shaped manner and such as to be directed radially outward. It is of course not absolutely necessary for these supporting arms to be oriented strictly radially, as shown in the example. Each of the supporting arms 27 comprises a perpendicular metal plate 33 which tapers outward and is screwed to an associated rib 34. The ribs 34 in turn are welded to the bearing body 24 such as to partly reach under the latter. Arranged underneath on the outer ends of the supporting arms 27 are mounting elements 28, with which the supporting arms 27 are mounted on the top side of the stator. The mounting elements 28 are designed to be bendable in the radial direction. In the case of the elements shown by way of example in FIGS. 2 and 3, this is achieved by two perpendicular, parallel sheet-metal strips which are arranged one behind the other in the radial direction and are connected to one another at the top and bottom in each case by a horizontal plate. However, the mounting elements may of course also be elastomeric cushions or other construction elements suitable for performing the function. The supporting arms 27 together with the bearing body 24 form a star-shaped bearing bracket 26 which passes the axial forces which act on the axial bearing into the foundation 21 via a stator (not shown for the sake of clarity). The mounting elements 28 bendable in the radial direction ensure that the movements which arise during thermal expansion of the star-shaped bearing bracket 26 are absorbed and the loading and deformation of the bearing body 24 are kept small. Likewise, the supporting arms are designed in such a way that the axial bearing also has only slight rigidity in the circumferential direction.

Figure 2:
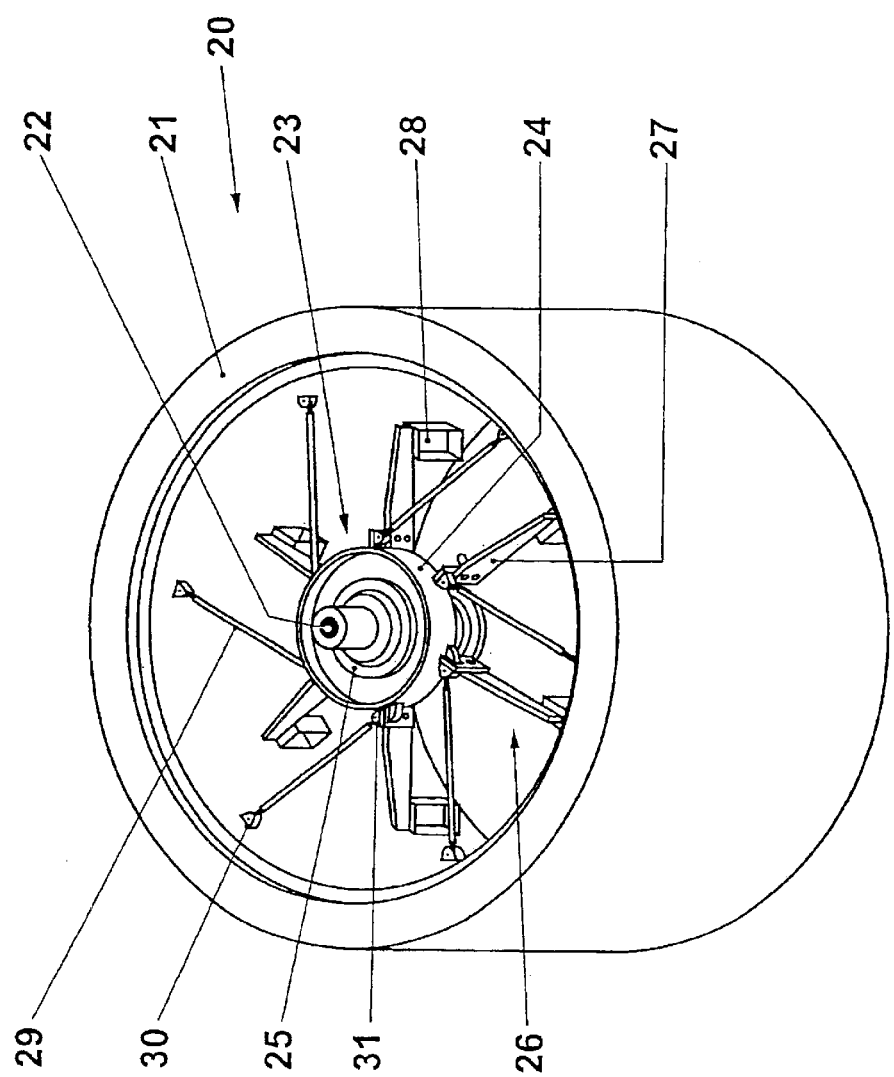
FIG. 2 shows a perspective view, obliquely from above, of a preferred exemplary embodiment for a bearing arrangement according to the invention in a hydrogenerator arranged in an annular foundation according to the configuration shown in FIG. 1.
Figure 3:
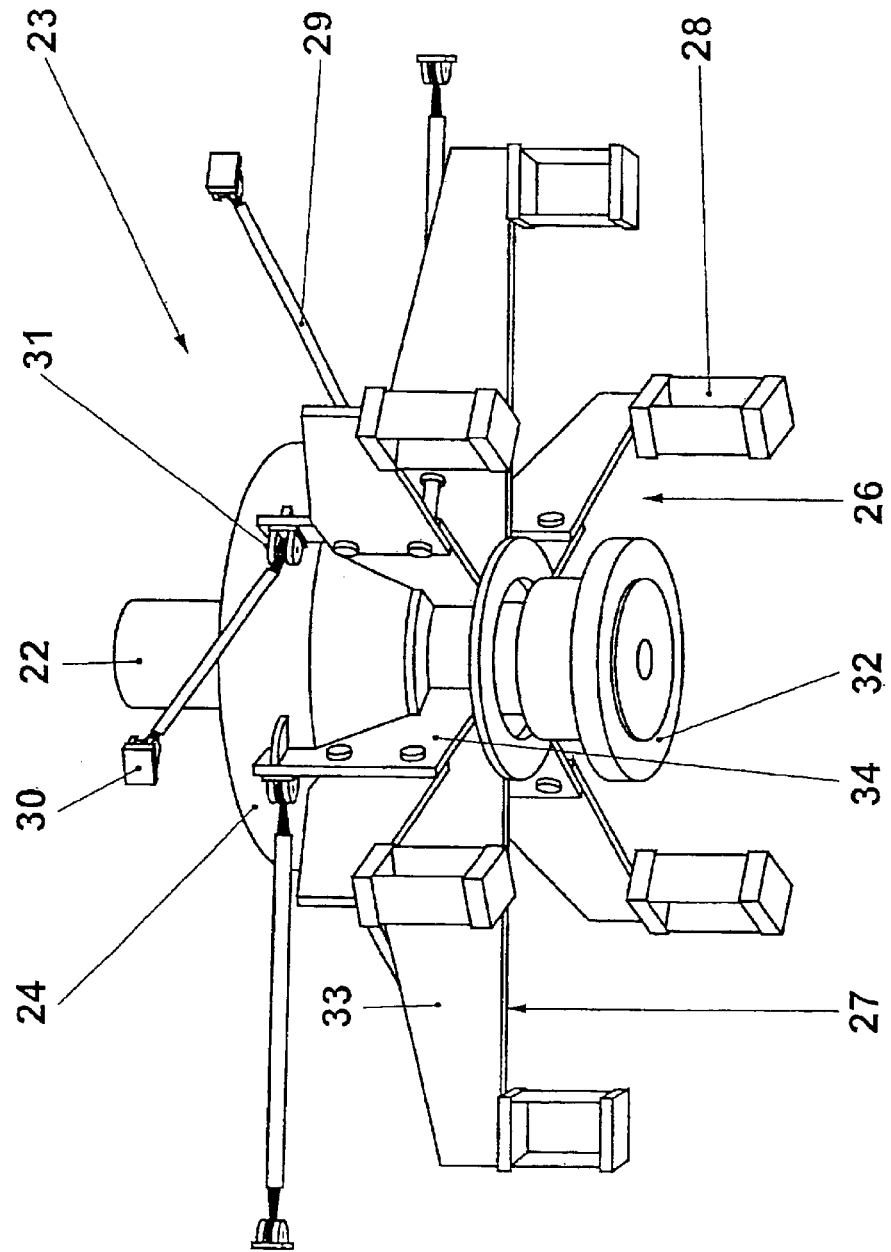
FIG. 3 shows a perspective oblique view, from below, of the bearing arrangement from FIG. 2 without the foundation.

On the other hand, the exact positioning of the bearing body 24 or of the shaft 22 with regard to the axis of rotation is carried out in the bearing arrangement according to FIGS. 2 and 3 by articulated struts 29 (six in the example) adjustable in length. In contrast to the designs realized hitherto, this has the advantage that it is possible to adjust the centering even in the ready assembled state. By means of bearing blocks 30, 31, the articulated struts 29, at the level of the radial bearing 25, are pivotably linked with the inner end to the outer shell of the bearing body 24 and with the outer end to the inside of the foundation 21. The articulated struts 29 are oriented tangentially to an imaginary circle arranged concentrically to the shaft 22, so that an expansion of the bearing body 24 is converted into a rotation about the axis of rotation of the machine. The articulated struts 29 are designed such as to be adjustable in length like a turnbuckle by means of a combination of a right-hand and a left-hand thread. It is thereby possible, in a simple manner and at any time, to not only center or recenter the rotor or the shaft with regard to the axis of rotation but to also build up symmetrical or asymmetrical prestresses which advantageously influence the running properties of the rotor, in particular with regard to vibration frequencies. Furthermore, the articulated struts 29 have the advantage that they are obtainable as commercially available components and, compared with complicated welded constructions, are comparatively light and space-saving. Suitable articulated struts are offered, for example, by the German company Lisega GmbH, Zeven, under the type designation 39.

The bearing arrangement according to the invention is distinguished overall by the following properties and special features:

the functions of supporting and positioning are separate;
support is still carried out by supporting arms;
the supporting arms are arranged radially;
the supporting arms are mounted on the outside on bendable elements on the stator; the thermal expansion is absorbed here, so that the bearing body is not loaded and deformed to an excessive degree;
the exact positioning of the bearing body or of the shaft is effected by articulated struts;
the articulated struts are fastened to the bearing body and to the foundation in a tangentially oriented manner at articulation points, so that the thermal expansion is easily converted into a rotary movement;
the radial supporting arms have low rigidity in the circumferential direction in such a way that the rotary movement of the bearing body is impaired as little as possible;
radial forces are passed via the articulated struts directly into the foundation;
the articulated struts are easily adjustable in length; as a result, the exact positioning of the shaft is readily possible; any requisite subsequent correction to the shaft position is also possible without any problems; and
the adjustable articulated struts permit the setting of a predetermined prestress of the bearing arrangement.

LIST OF DESIGNATIONS 10, 20 Hydrogenerator
11 Rotor
12, 22 Shaft
13 Supporting ring
14 Axial bearing (supporting bearing)
15, 16 Radial bearing (guide bearing)
17 Turbine
18 Combined axial and radial bearing
19 Axis
20 Radial/axial bearing unit
21 Foundation
22 Shaft
23 Combined axial and radial bearing
24 Bearing body
25 Radial bearing
26 Star-shaped bearing bracket
27 Supporting arm
28 Mounting element (bendable in the radial direction)
29 Articulated strut (adjustable in length)
30, 31 Bearing block
32 Flange
33 Metal plate
34 Rib

What is claimed is:
1. A bearing arrangement for the rotor of a rotating machine having a vertical axis, comprising:
a foundation, said foundation circumferentially surrounding the rotor;
a bearing body;
a combined axial and radial bearing positioned in the bearing body;
supporting arms fastened to the bearing body and configured and arranged to bear axial forces, the supporting arms each including a free end to be supported on a load-bearing base; and
tangentially oriented connecting elements positioned between the bearing body and the foundation, the connecting elements configured and arranged to bear-radial forces and center the bearing body;

wherein the connecting elements are linked at a first end to the foundation and are fastened at a second end to a coupling point arranged directly on the bearing body.

2. The bearing arrangement as claimed in claim 1, wherein the connecting elements are configured and arranged to be adjustable in their length.

3. The bearing arrangement as claimed in claim 2, wherein the connecting elements are configured and arranged to be infinitely adjustable in length.

4. The bearing arrangement as claimed in claim 3, wherein the connecting elements each comprise a turnbuckle having a left hand thread and a right hand thread.

5. The bearing arrangement as claimed in claim 1, further comprising bearing blocks on the bearing body and the foundation, and wherein the connecting elements comprise articulated struts which are pivotably linked at the bearing blocks to the bearing body and to the foundation.

6. The bearing arrangement as claimed in claim 1, wherein, within the combined axial and radial bearing, the radial bearing and the axial bearing are arranged offset from one another in the axial direction, and in that the connecting elements are linked to the bearing body in the region of the radial bearing and the supporting arms are linked to the bearing body in the region of the axial bearing.

7. The bearing arrangement as claimed in claim 1, further comprising:

a load-bearing base;

mounting elements bendable in the radial direction; and
wherein the supporting arms are mounted via the mounting elements with the supporting arm free ends on the load-bearing base so that the bearing arrangement independently and separately supports and guides.

8. The bearing arrangement as claimed in claim 1, further comprising:

a rotor;

a stator concentrically surrounding the rotor; and
wherein the supporting arms are supported with the supporting arm free ends on the stator.

9. A combination comprising:

a hydrogenerator having a vertically arranged axis; and
a bearing arrangement as claimed in claim 1.

* * * * *